United States Patent Office 2,739,294
Patented Mar. 20, 1956

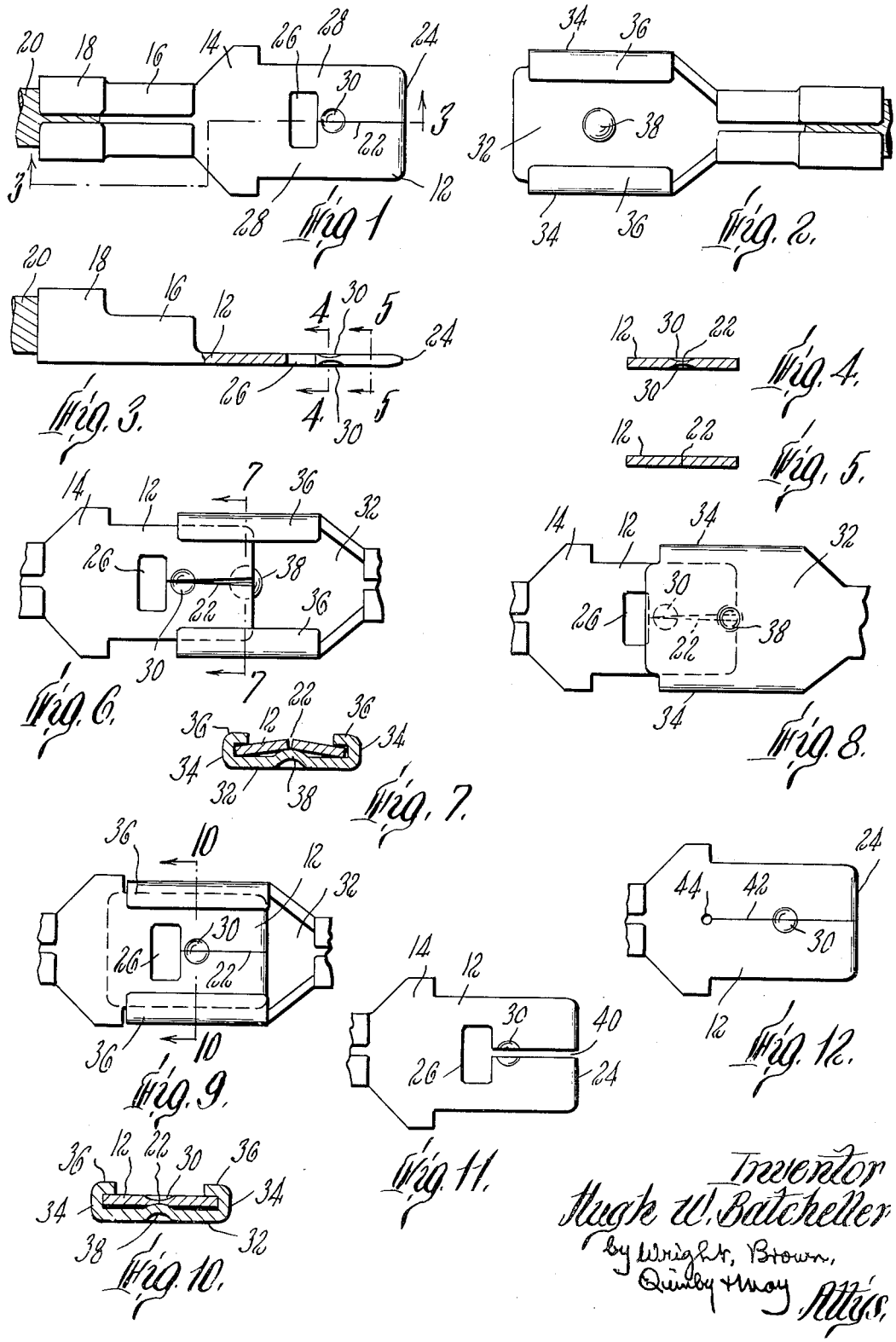

2,739,294

ELECTRIC CONNECTOR

Hugh W. Batcheller, Newton Highlands, Mass., assignor to Ark-Les Switch Corporation, Watertown, Mass., a corporation of Massachusetts Application September 16, 1952, Serial No. 309,828

6 Claims. (Cl. 339—256)

This invention relates to an electric connector of the type consisting of male and female members which interfit for engagement and disengagement, the male member having a tongue, usually plane, and the female member usually having a shallow channel with overhanging flanges to receive the male member in fitted engagement.

The invention relates more particularly to an improved form of male member and to a female member especially adapted to cooperate therewith, an object of the invention being to provide a novel male member which can be inserted into and removed from the corresponding female member with relative facility and which will be firmly pressed into contact with the female member when the connection has been made.

According to the invention the tongue of the male member is longitudinally split or slit from the entering end toward the opposite end. The corresponding female member comprises a piece of metal sheet or strip stock cut to form a suitable blank which is then bent to form a shallow channel with bent-up side walls and narrow inturned flanges spaced above the floor of the channel just enough to receive the tongue of the male member. The floor and flanges of the female member are substantially unyielding, and an upstanding boss is formed on the longitudinal median of the floor to engage in a corresponding recess in the male member when the later is fully inserted in the channel of the female member. When the split tongue of the male member is inserted in the female member, the split enables the portions on either side of the split to twist sufficiently to enable the central portion of the male member to ride over the boss while the side margins thereof are held down by engagement under the unyielding flanges. Additional flexibility of the split parts of the male member may be had by means of an aperture through the tongue at the inner end of the split, as hereinafter described.

For a more complete understanding of the invention reference may be had to the following description thereof and to the drawing of which—

Figures 1 and 2 are plan views of the male and female members, respectively, of an electric connector embodying the invention;

Figure 3 is a section on line 3—3 of Figure 1;

Figure 4 is a section on line 4—4 of Figure 3;

Figure 5 is a section on line 5—5 of Figure 3;

Figure 6 is a plan view of the members shown in Figures 1 and 2, the male member being partially inserted in the female member;

Figure 7 is a section on the line 7—7 of Figure 6;

Figure 8 is a bottom view of the electric connector shown in Figure 6, the members being in similar relative positions;

Figure 9 is a plan view of the connector shown in Figure 6 but with the male member fully inserted;

Figure 10 is a section on the line 10—10 of Figure 9;

Figure 11 is a plan view of a slightly modified form of male member; and

Figure 12 is a plan view of another modified form of the male member.

As illustrated in Figure 1 the invention may be embodied in the male and female members of an electric connector made from metal sheet or strip stock, the members being blanked out and bent to shape. As shown, the male member consists of a plane tongue 12 having parallel side edges, and a portion 14 of greater width than the tongue to limit the distance of insertion of the member into the channel of a female member. The tongue 12 may be provided with any suitable supporting portion such as collars 16 and 18 which are bent around the stripped end portion and the adjoining insulation, respectively, of an insulated wire 20.

According to the invention the tongue 12 is split as at 22, the split extending along the longitudinal median of the tongue from the entering end 24 of the tongue for a substantial distance toward the opposite end thereof. It is to be understood that as used in the specification and claims, the term "split" is a cut or crack in the tongue not involving the removal of any of the material thereof, the opposing edges formed by the split being substantially in mutual contact when the tongue is disengaged. In the form of the invention shown in Figure 1 an aperture 26 is provided at the inner end of the split 22, this aperture being in the form of a transverse slot, the ends of which are spaced inward from the sides of the tongue. This slot forms necks 28 which facilitate relative bending or twisting movements of the tongue portions on either side of the split 22. Recesses or dimples 30 are provided in the opposite faces of the tongue to receive a corresponding boss which, as hereinafter described, rises from the floor of the female member. The recesses 30 are preferably opposed as indicated in Figure 3 and are preferably bisected by the split 22.

A female connector member embodying the invention is shown in Figure 2, this member having a plane floor 32 with side walls 34 forming a shallow channel to receive the tongue 12. Narrow inturned flanges 36 project toward each other from the side walls 34 and overhang the side margins of the floor 32. The flanges 36 are preferably spaced above the floor 32 by a distance just sufficient to receive the side margins of the tongue 12 with a sliding fit. A boss 38 is formed on the floor 32, preferably on the median thereof, to enter one of the recesses 30 when the tongue 12 is inserted and thus to act as a detent to prevent accidental withdrawal of the tongue from the channel. The metal stock of which the connector members are made is preferably of sufficient thickness to have considerable rigidity so that the floor and flanges of the female member are substantially unyielding. Hence, were it not for the split 22, it would be very difficult if not impossible to push the entering end 24 of the tongue 12 beyond the boss 38. The split 22, however, enables the portions of the tongue on either side thereof to twist slightly as indicated in Figures 6 and 7. The central portion of the tongue consequently rides over the boss 38 while its side margins are held down by the flange 36 as the tongue is inserted in the channel until the recess 30 in the lower face of the tongue engages on the boss 38, as indicated in Figure 10. Since the boss 38 bears on the bottom of the tongue at the split, the torque arm which twists each part of the tongue is substantially equal to half the width of the tongue. In like manner the split 22 makes possible the removal of the male member from the female member since it permits the portions of the tongue on either side of the split to twist enough to release the boss 38 from the recess 30 when the tongue starts to move out of the channel.

Instead of the split 22 having the opposite edges thereof contiguous as in Figure 1, a narrow slot 40 may be provided as indicated in Figure 11, but the action of the portions of the tongue on either side of the slot is identical with that heretofore described when the tongue is inserted in the channel of a female member.

Figure 12 shows another slightly modified form of tongue, this form having a split 42 which extends from the entering end 24 for practically the entire length of the tongue itself. A small hole 44 may be provided at the inner end of the split 42, or the hole 44 may be omitted. In either event the portions of the tongue on either side of the split twist slightly as hereinbefore described when the tongue is inserted in the channel of the female member.

I claim:

1. An electric connector comprising a female member of sheet metal having a shallow channel portion with a substantially unyielding plane floor, side walls and substantially unyielding inturned flanges on said side walls, and a boss on the longitudinal median of the floor, and a corresponding male member having a plane tongue fitted between said side walls with its margins engaging under said flanges, said tongue having a recess in its under face fitted over said boss and a split extending from the entering end of the tongue and intersecting said recess, the opposing edges formed by the split being substantially in mutual contact when the tongue is disengaged from said side walls.

2. A male member of an electric connector comprising a flat tongue of stiff sheet metal adapted to be inserted in a complementary connector member, said tongue having a longitudinal split extending from the entering end thereof toward the other end, the opposing edges formed by the split being substantially in mutual contact.

3. A male member of an electric connector comprising a tongue of stiff sheet metal adapted to be inserted in a complementary connector member, said tongue having an aperture therethrough spaced from the entering end of the tongue, and a longitudinal split extending from said entering end to said aperture, the opposing edges formed by the split being substantially in mutual contact.

4. A connector member as in claim 3, said split being along the longitudinal median of said tongue.

5. A connector member as in claim 3, said aperture being a transverse slot with both ends spaced inward from the side edges of the tongue.

6. A connector member as in claim 3, said tongue having a recess in each of its faces between said entering end and said aperture, said recesses being intersected by said split.

References Cited in the file of this patent

UNITED STATES PATENTS

| | | |
|---|---|---|
| 1,153,580 | Sheppy | Sept. 14, 1915 |
| 2,336,385 | Batcheller | Dec. 7, 1943 |
| 2,393,481 | Smith | Jan. 2, 1946 |
| 2,398,433 | Macy | Apr. 16, 1946 |
| 2,471,923 | Batcheller | May 31, 1949 |
| 2,517,677 | Kjell-Berger et al. | Aug. 8, 1950 |